No. 745,032. PATENTED NOV. 24, 1903.
A. M. ACKLIN.
DEVICE FOR OPERATING TRIPPERS FOR BELT CONVEYERS.
APPLICATION FILED JULY 20, 1903.
NO MODEL. 2 SHEETS—SHEET 1.
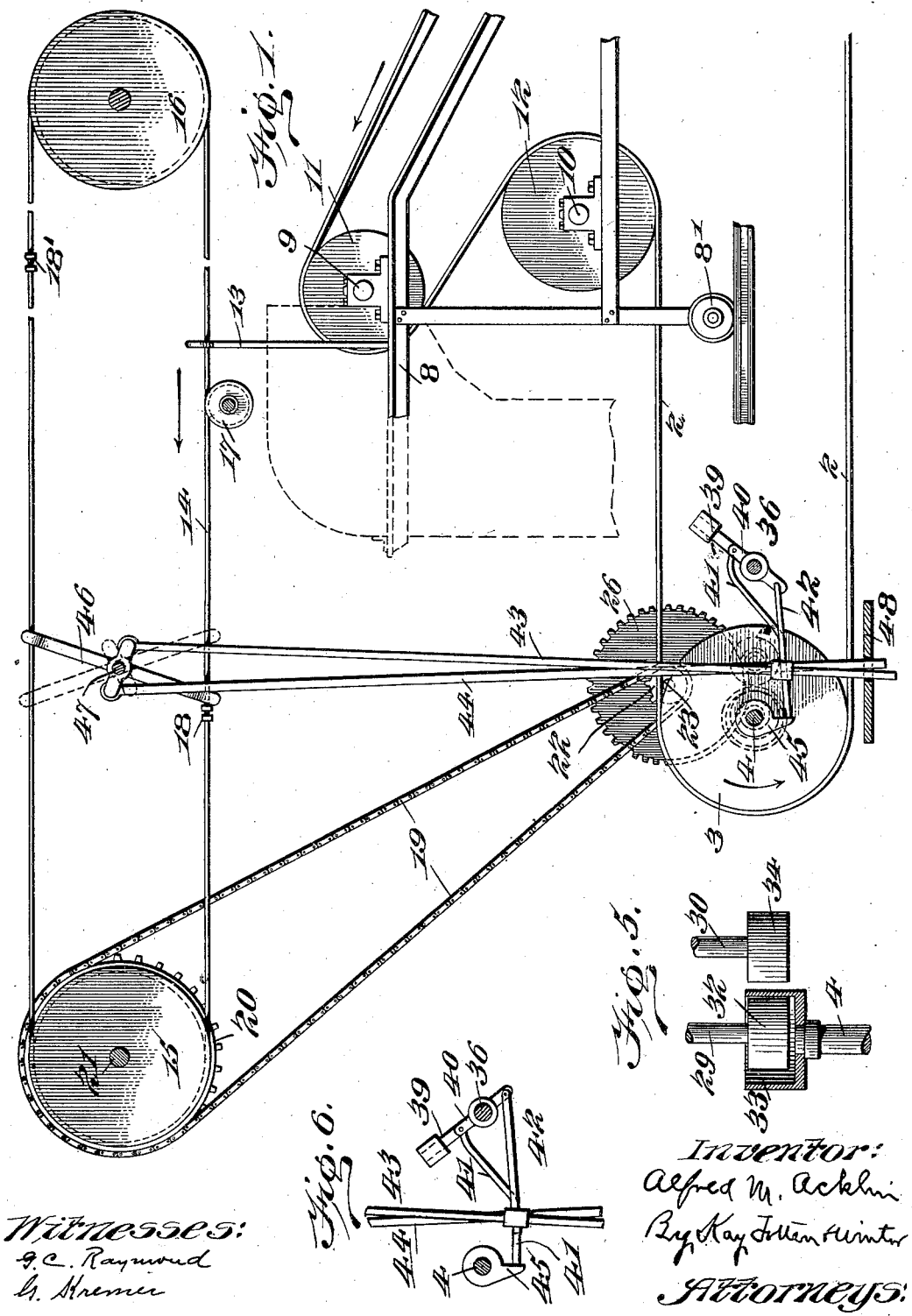
Witnesses:
G. C. Raymond
G. Kremer
Inventor:
Alfred M. Acklin
By Kay Totten Hunter
Attorneys

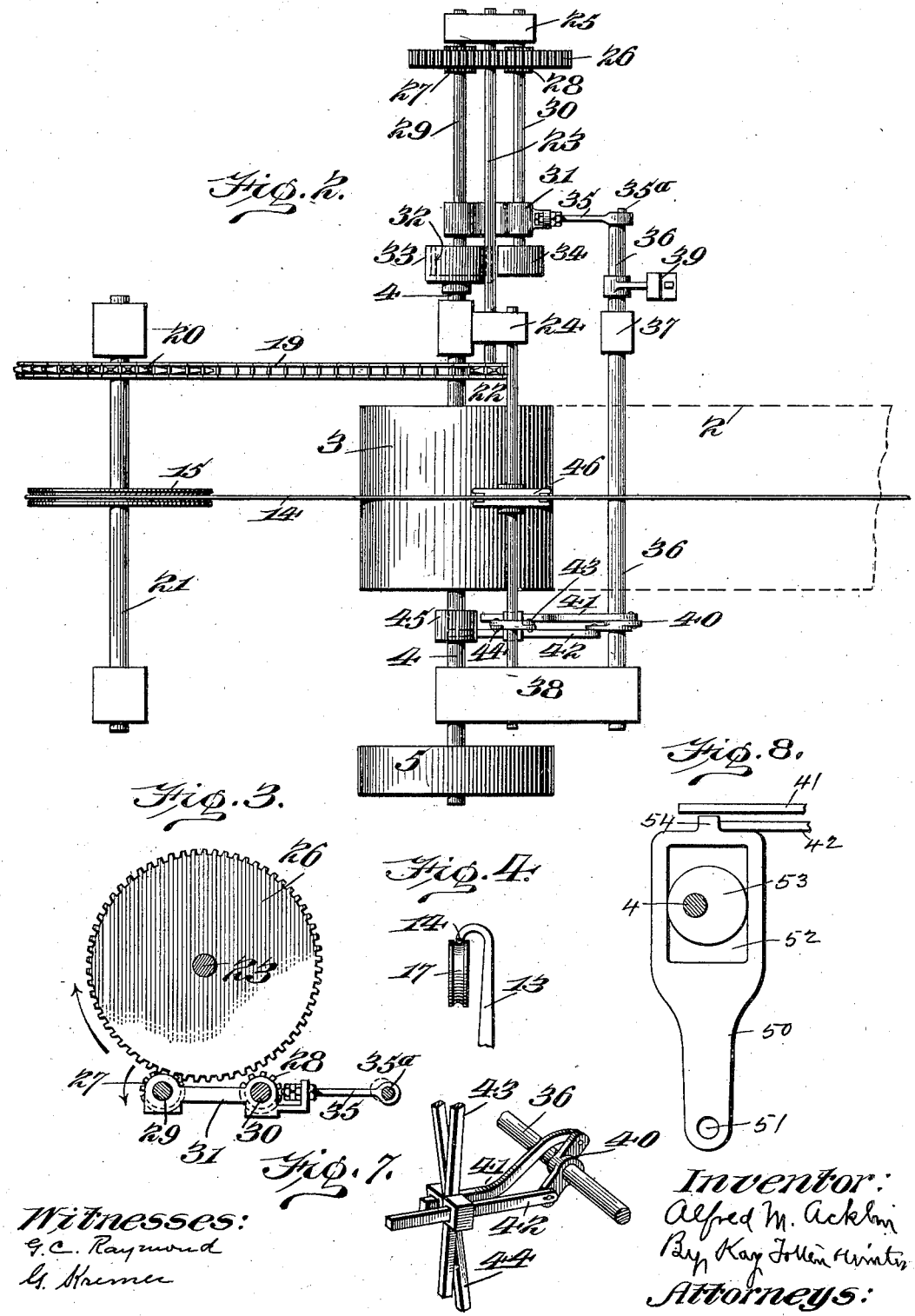

No. 745,032. Patented November 24, 1903.

UNITED STATES PATENT OFFICE.

ALFRED M. ACKLIN, OF PITTSBURG, PENNSYLVANIA, ASSIGNOR TO HEYL & PATTERSON, OF PITTSBURG, PENNSYLVANIA, A COPARTNERSHIP.

DEVICE FOR OPERATING TRIPPERS FOR BELT CONVEYERS.

SPECIFICATION forming part of Letters Patent No. 745,032, dated November 24, 1903.

Application filed July 20, 1903. Serial No. 166,349. (No model.)

*To all whom it may concern:*

Be it known that I, ALFRED M. ACKLIN, a resident of Pittsburg, in the county of Allegheny and State of Pennsylvania, have invented a new and useful Improvement in Devices for Operating Trippers for Belt Conveyers; and I do hereby declare the following to be a full, clear, and exact description thereof.

My invention relates to a tripper for belt conveyers, its object being to provide a simple and efficient form of apparatus for moving the tripper, so that its direction of travel may be reversed automatically.

To these ends my invention comprises, generally stated, a suitably-driven endless cable to which the tripper-frame is secured and tripping mechanism in the path of the endless cable and adapted to be operated thereby, whereby the direction of travel of the tripper-frame is reversed.

To enable others skilled in the art to make and use my invention, I will describe the same more fully, referring to the accompanying drawings, in which—

Figure 1 is a side view, partly broken away, of my improved tripper and the mechanism for reversing same. Fig. 2 is a plan view of the tripping mechanism. Fig. 3 is an enlarged detail of a portion of the reversing mechanism. Fig. 4 is an enlarged detail of the manner of securing the tripper to the endless cable. Fig. 5 is a plan view, partly in section, of the friction devices for transmitting power to the cable. Fig. 6 is a detail view of the rock-shaft in reversed position. Fig. 7 is a detail perspective view. Fig. 8 is a modified form of a portion of the reversing mechanism.

Like numerals indicate like parts in each of the figures.

My invention relates to that class of conveyers in which a belt is employed for conveying the grain, coal, or other granular material and adapted to distribute it at different points along the line of travel of the belt or discharge it into different bins along the line of travel of the belt.

Accordingly in the drawings the numeral 2 indicates a broad belt of such a character, said belt passing around the pulley 3, mounted on the shaft 4, said shaft being driven by a suitable power and being provided with the belt-pulley 5. At the other end of the belt is arranged a pulley (not shown) similar to the pulley 3, around which the belt 2 passes. The material to be conveyed is discharged upon the belt at a suitable point and is carried by said belt to the point of discharge.

The tripper-frame 8 may be built up of angles and bars in any suitable manner, said frame being mounted on wheels 8', adapted to run upon a suitable track. Supported within bearings on the frame 8 are the shafts 9 and 10, upon which are mounted the idle pulleys 11 and 12, respectively. The belt 2 passes around these pulleys 11 and 12 in the manner illustrated, and connected to the frame 8 is the hood or hopper (shown in dotted lines) so arranged with reference to the pulley 11 that the material carried up upon the belt 2 is discharged from the top of said pulley into the hood or hopper, whence it passes to the proper point of discharge.

Secured to the frame 8 is the arm 13, the upper end of said arm being secured to the endless cable 14 by any suitable clamp, said cable being mounted upon the pulleys 15 and 16. The cable 14 passes over suitable idle pulleys 17, which may be arranged at proper distances apart. The cable 14 is further provided with suitable enlargements 18 for the purpose fully hereinafter set forth.

The cable 14 is driven by means of the sprocket-chain 19, which engages the sprocket-wheel 20 on the shaft 21, the other end of said sprocket-chain 19 passing around the small sprocket 22 on the shaft 23. This shaft 23 is mounted in suitable bearings 24 25, and at its opposite end is mounted the gear-wheel 26. This gear-wheel 26 is adapted to mesh with pinions 27 28, mounted on shafts 29 and 30, respectively, said shafts at their inner ends being journaled in movable bearings 31 for the purpose hereinafter stated. Connected to the shaft 29 is the friction-wheel 32, which enters the hollow friction-wheel 33, mounted on the main shaft 4. The shaft 30 has mounted on one end thereof the friction-wheel 34, which is adapted to be thrown into contact with the exterior of the friction-wheel 33, while the friction-wheel 32 is adapted to be thrown into contact with the inner face of friction-wheel 33 by the movement of the bearing-block 31. To provide for this movement of the friction-wheels 32 and 34, I provide the following mechanism: Connected to the bearings 31 is the pitman 35 with the crank 35ª, which is mounted on the rock-shaft 36, said rock-shaft being supported in suitable bearings 37 38. The rock-shaft 36 is provided with the weighted arm 39 and also with the arm 40. The last-named arm 40 has the rod 41 connected to the upper end thereof, while the rod 42 is connected to the lower end of said arm at opposite sides of the axial line of said rock-shaft. The rods 41 42 pass through openings in the vertical rods 43 and 44, respectively, said rods 41 and 42 having a sliding movement therein. Mounted on the main shaft 4 is the knocker 45, which is adapted to come in contact with the end of one of the rods 41 42 and adapted through said rods to turn the shaft 36 in position to throw one of the friction-wheels 32 34 into or out of engagement with the friction-wheel 33, as fully hereinafter set forth.

The rods 43 44 are connected at their upper ends to the tripping-arm 46, said arm being mounted on the shaft 47. The cable 14 passes through the upper and lower end of the tripping-arm 46, and said tripping-arm is adapted to be moved by the enlargement 18 or enlargement 18' on the cable 14, as the case may be. The lower ends of the rods 43 44 pass through a suitable guide-plate 48. In Fig. 8 I have illustrated a modified form of knocker in which a swinging arm 50 is pivoted at 51, said arm having the opening 52, within which the eccentric 53 on shaft 4 works, so that as said shaft rotates it swings the arm 50 from one side to the other. The arm 50 has the lug 54, adapted to engage alternately the ends of the rods 41 42.

When my improved tripper is in operation, the material to be conveyed is discharged onto the belt at a suitable point, and the tripper-frame is carried along in the direction of the arrow, Fig. 1, by means of the cable 14, the lower portion thereof, to which said frame is secured, traveling in that direction. The material is carried up the belt and discharged into the hood or hopper, whence it passes to suitable bins along the route, and when the tripper-frame arrives at the position indicated in Fig. 1, where the tripping apparatus is located, the enlargement 18 strikes the lower end of the tripping-arm 46 at the position indicated in dotted lines, Fig. 1, and carries said tripping-arm to the position indicated in full lines in Fig. 1. This will act to raise the rod 44 and lower the rod 43. The raising of the rod 44 will act to raise the short rod 42 and lower the other short rod, 41, whereby the rod 42 is brought into the path of the knocker 45, and said knocker moving in contact with said rod will force said rod back and act to rock or turn the shaft 36 until the center is passed, whereupon the weight 39 will act to throw said shaft into the position shown in Fig. 1, whereupon the rod 42 will assume the position shown in Fig. 6 and out of the path of the knocker 45. This movement of the shaft 36 will act to move the arm 35, connected to the bearings 31, which carry the shafts 29 and 30, whereupon the friction-wheel 34 will be thrown into contact with the exterior of the friction-wheel 33 and the friction-wheel 32 will be thrown out of contact with the interior or face of the friction-wheel 33, whereby the power is transmitted from the shaft 4 to the shaft 30 and through the pinions 27 28 to the large gear-wheel 26, reversing the direction of rotation of the same. This reverse movement will be communicated through the sprocket-chain 19 to the shaft 21 and to the pulley 15, mounted on said shaft, whereby the direction of travel of the cable 14 will be reversed and the cable will act to carry the tripper-frame 8 back in the opposite direction. The tripper-frame will continue to move back in this direction until the enlargement 18' strikes the upper end of the tripping-arm 46, whereupon in the same manner as above described the reversing mechanism will be operated to change the direction of travel of the cable 14.

By the above construction I provide a simple and efficient device for operating the tripper and one which operates automatically, so that no attention need be paid to the apparatus after it has once been set in motion. It is apparent that the various parts of the device may be changed and varied without departing from my invention.

What I claim as my invention, and desire to secure by Letters Patent, is—

1. In a tripper for belt conveyers, the combination of a traveling endless cable, a tripper-frame connected thereto, and mechanism for reversing the direction of travel of said cable.

2. In a tripper for belt conveyers, the combination of a traveling endless cable, a tripper-frame connected thereto, mechanism for reversing the direction of travel of said cable actuated by said cable.

3. In a tripper for belt conveyers, the combination of a traveling endless cable, a tripper-frame connected thereto, a tripping-arm in the path of said cable, and mechanism for reversing the direction of travel of said cable, and connections between said tripping-arm and said mechanism.

4. In a tripper for belt conveyers, the combination of a traveling endless cable, a tripper-frame connected thereto, an oscillative tripping-arm in the path of said cable, mechanism for reversing the direction of travel of said cable, and connections between said tripping-arm and said mechanism.

5. In a tripper for belt conveyers, the combination of a traveling endless cable, a tripper-frame, an arm on said frame connected to said cable, and mechanism for reversing the direction of travel of said cable.

6. In a tripper for belt conveyers, the combination of a traveling endless cable, a tripper-frame connected thereto, an oscillative tripping-arm, said cable having enlargements thereon adapted to contact with the opposite ends of said arm, mechanism for reversing the direction of travel of said cable, and connections between said arm and said mechanism.

7. In a tripper for belt conveyers, the combination of a traveling endless cable, a tripper-frame connected thereto, a main shaft, a reversing-shaft, connections between said reversing-shaft and the cable-shaft, mechanism for reversing said reversing-shaft from said main shaft, said mechanism being operated by the movement of said cable.

8. In a tripper for belt conveyers, the combination of a traveling endless cable, a tripper-frame connected thereto, a main shaft, a friction-wheel on said main shaft, movable shafts, friction-wheels on said movable shafts adapted to be moved into contact with opposite faces of said first friction-wheel, a reversing-shaft, connections between said movable shafts and said reversing-shaft, and mechanism operated by said cable for moving said movable shafts.

9. In a tripper for belt conveyers, the combination of a traveling endless cable, a tripper-frame connected thereto, a main shaft, a hollow friction-wheel on said main shaft, movable shafts, friction-wheels on said movable shafts adapted to engage one with the inner face of said first-named friction-wheel and the other with the exterior thereof, a reversing-shaft, connections between said movable shafts and said reversing-shaft, and mechanism operated by the said cable for moving said movable shafts.

10. In a tripper for belt conveyers, the combination of a traveling endless cable, a tripper-frame connected thereto, a main shaft, oppositely-rotary shafts adapted to be alternately rotated by said main shaft, a reversing-shaft, connections between said oppositely-rotary shaft and said main shaft, and mechanism operated by said cable for throwing said oppositely-rotary shafts in engagement with said main shaft.

11. In a tripper for belt conveyers, the combination of a traveling endless cable, a tripper-frame connected thereto, a main shaft, movable shafts adapted to be thrown alternately into engagement with said main shaft to be oppositely rotated thereby, a reversing-shaft connected to said movable shafts, a rock-shaft connected to said movable shafts, and mechanism operated by said cable for operating said rock-shaft.

12. In a tripper for belt conveyers, the combination of a traveling endless cable, a tripper-frame connected thereto, a main shaft, movable shafts adapted to be thrown alternately into engagement with said main shaft to be oppositely rotated thereby, a reversing-shaft connected to said movable shafts, a projection on said rock-shaft, a knocker on said main shaft, and mechanism operated by said cable to bring said projection into the path of said knocker to rock said rock-shaft.

13. In a tripper for belt conveyers, the combination of a traveling endless cable, a tripper-frame connected thereto, a main shaft, movable shafts adapted to be thrown alternately into engagement with said main shaft to be oppositely rotated thereby, a reversing-shaft connected to said movable shafts, a projection on said rock-shaft, a knocker on said main shaft, and a rod connected to said projection adapted to throw said projection into the path of said knocker, said rod being operated by the movement of said cable.

14. In a tripper for belt conveyers, the combination of a traveling endless cable, a tripper-frame connected thereto, a main shaft, movable shafts adapted to be thrown alternately into engagement with said main shaft to be oppositely rotated thereby, a reversing-shaft connected to said movable shafts, projections extending from opposite sides of said rock-shaft, a knocker on said main shaft, rods connected to said projections adapted to throw said projections alternately into the path of said knocker, said rods being operated by the movement of said cable.

15. In a tripper for belt conveyers, the combination of a traveling endless cable, a tripper-frame connected thereto, a main shaft, movable shafts adapted to be thrown alternately into engagement with said main shaft to be oppositely rotated thereby, a reversing-shaft connected to said movable shafts, projections extending from opposite sides of said rock-shaft, a knocker on said main shaft, rods connected to said projections, an oscillative arm to which said rods are connected, and means for oscillating said arm by the movement of said cable.

16. In a tripper for belt conveyers, the combination of a traveling endless cable, a tripper-frame connected thereto, a main shaft, movable shafts adapted to be thrown alternately into engagement with said main shaft to be oppositely rotated thereby, a reversing-shaft connected to said movable shafts, a projection on said rock-shaft, a weighted lever on said rock-shaft, a knocker on said main shaft, and mechanism operated by said cable adapted to bring said projection into the path of said knocker to rock said rock-shaft.

17. In a tripper for belt conveyers, the combination of a traveling endless cable, a tripper-frame connected thereto, a main shaft, movable shafts adapted to be thrown alternately into engagement with said main shaft to be oppositely rotated thereby, a reversing-shaft connected to said movable shafts, projections extending from opposite sides of said rock-shaft, a knocker on said main shaft, rods having openings therein through which said projections pass, and mechanism operated by said cable adapted to raise and lower said rods alternately.

18. In a tripper for belt conveyers, the combination of a traveling endless cable, a tripper-frame connected thereto, a main shaft, movable shafts adapted to be thrown alternately into engagement with said main shaft to be oppositely rotated thereby, a reversing-shaft connected to said movable shafts, projections extending from opposite sides of said rock-shaft, a knocker on said main shaft, rods having openings therein through which said projections pass, a guide through which said rods pass, and mechanism operated by said cable adapted to raise and lower said rods alternately.

19. In a tripper for belt conveyers, the combination of a traveling endless cable, a tripper-frame connected thereto, a main shaft, movable shafts, mechanism operated by said cable adapted to throw said movable shafts alternately into engagement with said main shaft to be oppositely driven thereby, pinions on said movable shafts, a reversing-shaft, a gear-wheel on said reversing-shaft with which said pinions engage, and connections between said reversing-shaft and the cable-shaft.

In testimony whereof I, the said ALFRED M. ACKLIN, have hereunto set my hand.

ALFRED M. ACKLIN.

Witnesses:
ROBERT C. TOTTEN,
G. C. RAYMOND.